United States Patent [19]
Nadjafi et al.

[11] Patent Number: 5,871,284
[45] Date of Patent: Feb. 16, 1999

[54] FOIL THRUST BEARING SET

[75] Inventors: Robert H. Nadjafi, San Pedro; Mickey Joe Andrews, Lomita, both of Calif.

[73] Assignee: AlliedSignal Inc., Morristown, N.J.

[21] Appl. No.: 927,663

[22] Filed: Sep. 10, 1997

[51] Int. Cl.⁶ .................................................. F16C 17/06
[52] U.S. Cl. ........................................ 384/105; 384/106
[58] Field of Search .................................. 384/105, 106, 384/104, 103

[56] References Cited

U.S. PATENT DOCUMENTS 5,248,205  9/1993  Gu et al. .
5,318,366  6/1994  Nadjafi .

*Primary Examiner*—Lenard A. Footland
*Attorney, Agent, or Firm*—Robert Desmond. Esq.

[57] ABSTRACT

A spring assembly for a foil thrust bearing set includes a stiffener disc and a plurality of spring segments. Each spring segment has at least two anchoring tabs. When inserted into a slot in the stiffener disc, the anchoring tabs anchor the spring segment to the stiffener disc.

20 Claims, 5 Drawing Sheets

FOIL THRUST BEARING SET

BACKGROUND OF THE INVENTION

The invention relates to bearings in general and foil thrust bearings in particular.

Foil thrust bearings are very attractive for high speed rotating machinery because they do not require oil-based lubrication and the maintenance demands of an oil-based lubrication system. Instead of using oil, foil thrust bearings use a process fluid such as air, methane, water, or gaseous or liquid hydrogen, nitrogen or oxygen.

Metal foils, spring assemblies and other components of the foil bearings can be difficult to manufacture. In the spring assembly, for example, a unitary spring cluster is spot-welded to a spring stiffener disc. Spot-welding places restrictions on the types of materials that can be used for the spring cluster and the stiffener disc. Dissimilar metals for the spring cluster and the stiffener disc cannot be used, even though such use might be desirable.

Fabricating spring clusters for the spring assemblies can be difficult, especially for large bearings. A spring cluster is fabricated by chemically etching spring sectors in a very thin sheet of metal. For small foil bearings this is feasible but complex. However, as the rotating machines become larger, and larger foil thrust bearings are needed, fabricating a large spring cluster from a single sheet of very thin metal will become even more complex and possibly unfeasible.

Welded spring clusters can also lead to maintenance problems. If a single spring sector in the spring cluster is damaged, the spring cluster cannot be unwelded from the stiffener disc. Instead, the entire spring assembly must be replaced.

SUMMARY OF THE INVENTION

A foil bearing set comprises a foil bearing assembly including a plurality of compliant foils; and a spring assembly including a stiffener disc, and at least one spring segment underlying the plurality of compliant foils. Each spring segment includes a spring portion and anchoring means for anchoring the spring portion to the stiffener disc, the anchoring means being integral with the spring portion.

DETAILED DESCRIPTION OF THE INVENTION

Figure 1:
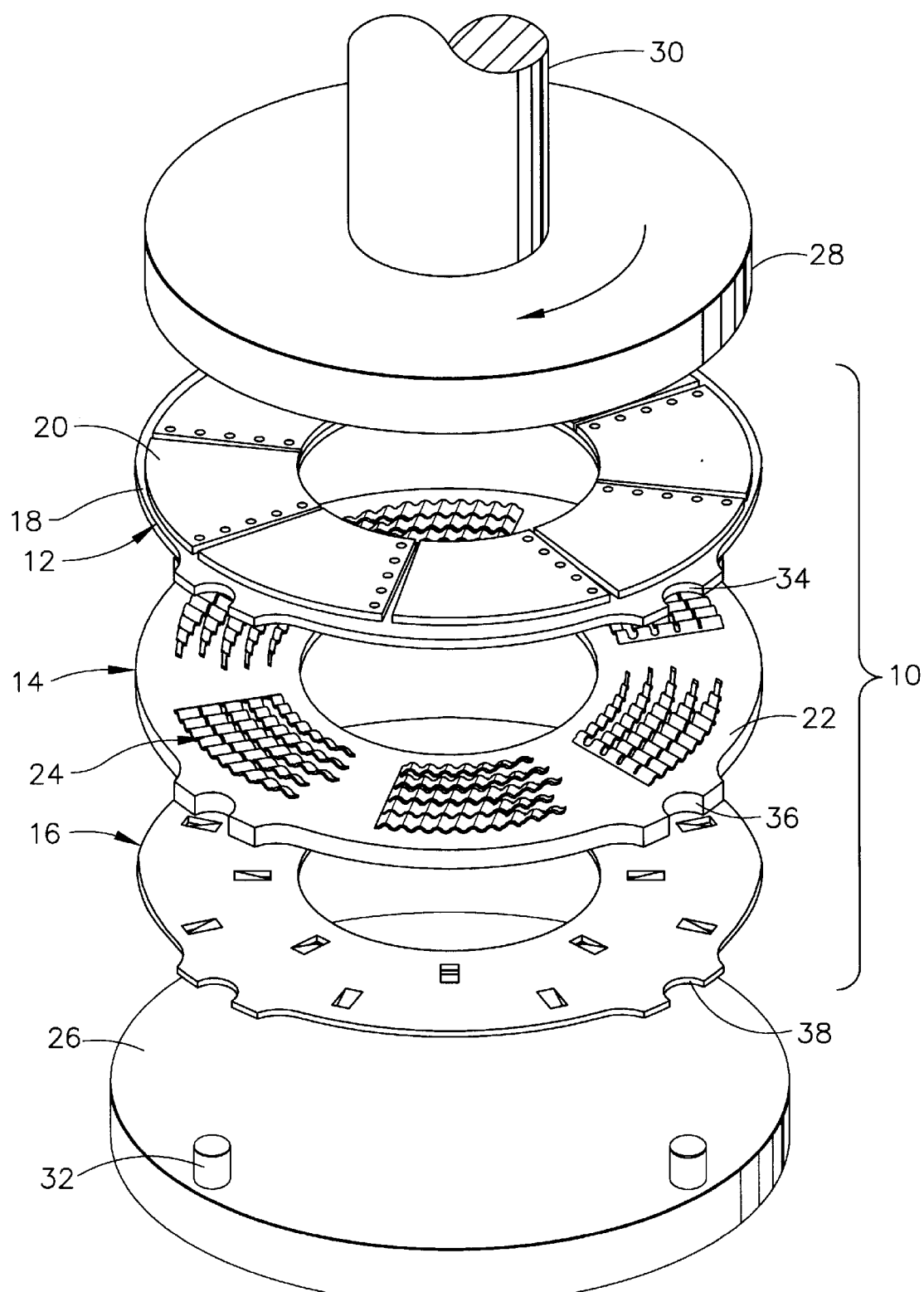
FIG. 1 is an exploded perspective view of a foil thrust bearing set according to the present invention.
Figure 2:
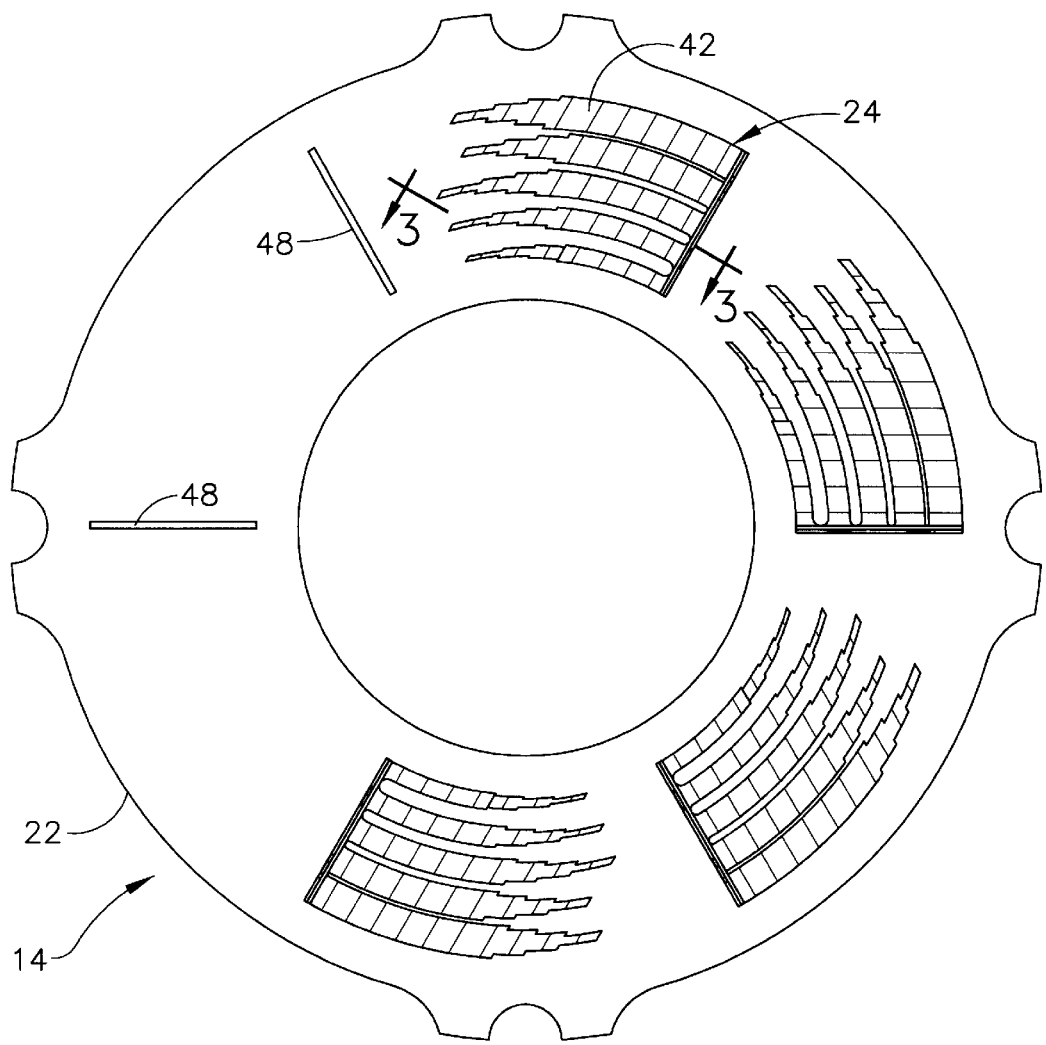
FIG. 2 is a top plan view of a spring assembly that is partially assembled, the spring assembly forming a part of the foil thrust bearing set of FIG. 1.
Figure 3:
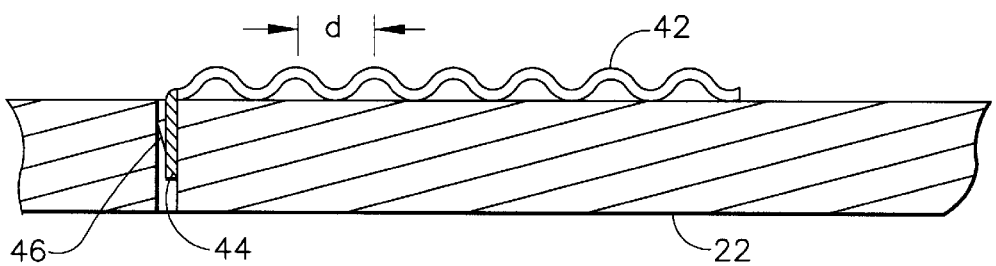
FIG. 3 is a cross-sectional view of the spring assembly, the cross-sectional view being taken along lines 3—3 of FIG. 2.
Figure 4:
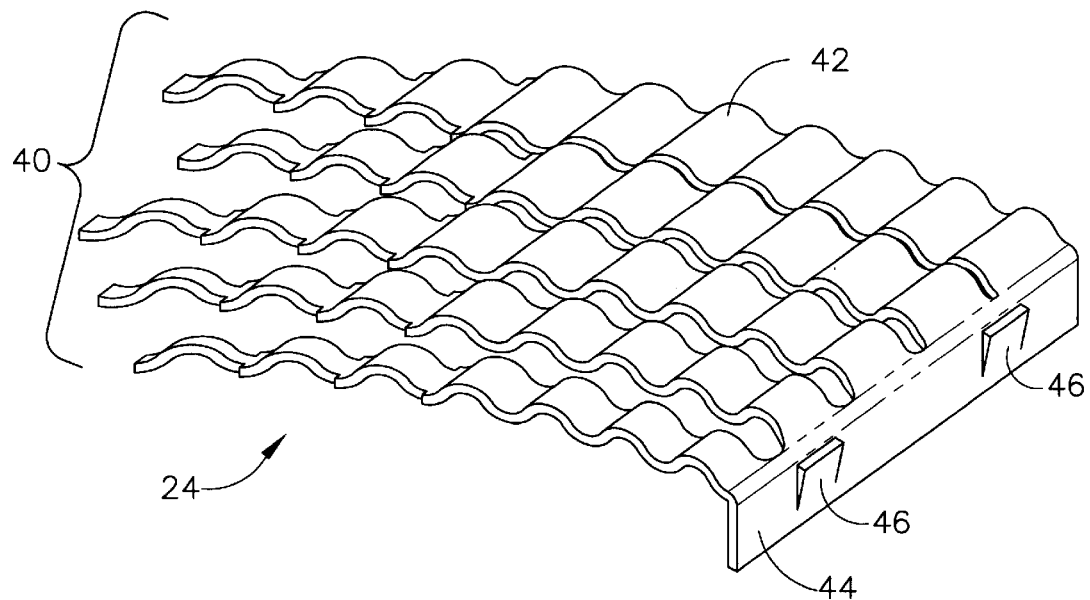
FIGS. 4 and 4a are perspective views of a spring segment, which forms a part of the spring assembly shown in FIGS. 1 and 2.
Figure 4A:
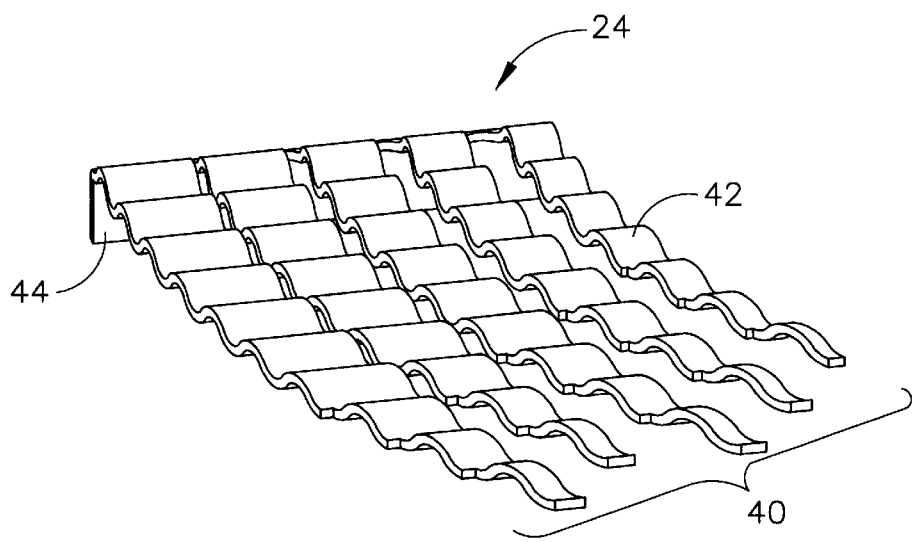

FIG. 1 shows a foil thrust bearing set 10 including a foil bearing assembly 12, a spring assembly 14 and a follower spring 16. The foil bearing assembly 12 includes a bearing disc 18 and a plurality of compliant foils 20 that are formed integrally with, or spot-welded to, the bearing disc 18. Construction of the foil bearing assembly 12 is described in greater detail in U.S. Pat. No. 5,318,366, which is assigned to the assignee of the present invention.

The spring assembly 14 includes a stiffener disc 22 and a plurality of spring segments 24. Each spring segment 24 supports an overlying foil 20 to improve bearing load carrying capability. The spring segments 24 are anchored to the stiffener disc 22. The spring assembly 14 is described in greater detail below.

The foil thrust bearing set 10 is positioned between a housing or thrust plate 26 and a runner 28, which is secured to the end of a shaft 30. The follower spring 16, which is also described in U.S. Pat. No. 5,318,366, preloads the foil bearing assembly 12 and the spring assembly 14 against the runner 28. Anchoring pins 32 on the thrust plate 26 engage projections 34, 36, 38 on the bearing disc 18, the stiffener disc 22 and the spring follower 16 to prevent relative rotation between the bearing assembly 12, the spring assembly 14, the spring follower 16 and the thrust plate 26. The foil thrust bearing set 10 uses a process fluid such as air, methane, water, or gaseous or liquid hydrogen, nitrogen or oxygen.

When the runner 28 is rotated relative to the thrust plate 26, a fluid film is generated between the bearing assembly 12 and the runner 28. At high rotational speeds, pressure build-up within the fluid film supports the runner 28, while maintaining a separation between the runner 28 and the bearing assembly 12.

FIGS. 2 to 4a show the spring assembly 14 in greater detail. The spring assembly 14 accommodates six spring segments 24, although only four spring segments 24 are shown (the spring assembly 14 is only partially assembled). The spring assembly 14 accommodating six spring segments 24 is shown merely for exemplary purposes. Other spring assemblies could accommodate more or less than six spring segments 24.

Each spring segment 24 has a spring portion 40. Shown is a spring portion 40 having five individual spring sectors 42, with each spring sector 42 being corrugated. Stiffness of each such spring sector 42 can be determined by design parameters such as the distance d between corrugation peaks, the thickness of the spring sector 42, and the length of the spring sector 42. The relative stiffnesses of the spring sectors 42 in a spring segment 24 determine the amount of deflection of the overlying foil 20 and, therefore, the thickness of the fluid film above the foil 20. For a spring segment 24 having spring sectors 42 of uniform stiffness, foil deflection and support for the runner 28 will be lowest near the center of the bearing set 10. However, by arranging the spring sectors 42 of a spring segment 24 in order of varying stiffness, specific deflection profiles can be achieved. An arrangement of spring sectors 42 having stiffnesses that increase radially inward towards the center of the spring assembly 14 also tends to produce non-uniform fluid films that are thinnest and provide the least support near the center of the bearing set 10. An arrangement of spring sectors 42 having stiffnesses that decrease radially inward is disclosed in U.S. Pat. No. 5,110,220, which is assigned to the assignee of the present invention. Such an arrangement tends to produce a relatively uniform film thickness and uniform support across the foils 20 in a radial direction. An arrangement of spring sectors 42 having stiffnesses that vary in the circumferential direction and that decrease radially inward is disclosed in U.S. Pat. No. 5,318,366. Such an arrangement tends to produce an optimum film shape across the foil in the radial and circumferential directions for maximum load capacity.

Each spring segment 24 also has an anchoring portion 44, which is integral with the spring portion 40. The anchoring portion 44 is bent at a substantially right angle to the spring portion 40. Formed integrally with, and bent away from, the anchoring portion 44 are a pair of anchoring tabs 46. The anchoring tabs can be placed as close as possible to the edges of the anchoring portion 44. Although two anchoring tabs 46 are shown, each spring segment 24 can have a single anchoring tab or more than two anchoring tabs 46.

The anchoring portion 44 is inserted into a radially-extending slot 48 in the stiffener disc 22. The anchoring tabs 46 cause the anchoring portion 44 to be wedged within the slot 48, thereby causing the spring segment 24 to be anchored to the stiffener disc 22.

A spring segment 24 can be removed easily from the stiffener disc 22 if the anchoring tabs 46 are made collapsible. An instrument is inserted into a slot 48 to collapse the anchoring tabs 46, and the spring segment 24 is withdrawn from the slot 48. Such easy insertion and removal would not be possible had the spring segment 24 been spot-welded to the stiffener disc 22.

Since the spring segments 24 are not spot-welded to the stiffener disc 22, the spring segments 24 can be made of a metal that is dissimilar to that of the stiffener disc 22. For example, the stiffener disc 22 can be made of a nickel-based alloy and the spring segments 24 can be made of stainless steel or beryllium-copper; or the stiffener disc 22 can be made of a beryllium-copper and the spring segments 24 can be made of a nickel-based alloy. Instead of making spring segments 24 of metal, the spring segments 24 can be made of a composite material such as a glass fiber-reinforced composite, a carbon fiber-reinforced composite, or a metal-reinforced composite. As a consequence, use can be made of a wider range of spring sector materials that are compatible with the process fluid of the bearing set 10.

A spring segment 24 can be fabricated from a sheet of metal or composite material having a thickness between 0.005 cm and 0.050 cm. In a first step, the spring sectors 42 are chemically etched or machined in the sheet. At the same time, the anchoring tabs 46 are formed by chemically etching or machining U-shaped slots in the sheet. Exemplary minimum dimensions for each anchoring tab 46 include a height of 0.013 cm and a width of 0.050 cm. In a second step, the corrugations in the spring sectors 42 are formed by a stamping process. Also in the second step, the anchoring portion 44 is bent at a substantially right angle to the spring portion 40. In a third step, the anchoring tabs 46 are bent outward. These three steps can be performed sequentially or simultaneously.

The stiffener disc 22 has a minimum thickness such that the anchoring tabs 46, when fully inserted, do not protrude through the slots 48. For the exemplary anchoring tabs 46 above, a stiffener disc 22 made of stainless steel or a nickel-based alloy might have a minimum thickness of 0.100 cm. The radially-extending slots 48 can be machined into the stiffener disc 22. Widths of the slots 48 are determined by the thicknesses of the spring segments 24. Although shown as extending radially, the slots 48 can extend in any direction.

The materials for the spring segments 24 and the stiffener disc 22 can have different coefficients of thermal expansion. If the material for the spring segments 24 has a higher coefficient of thermal expansion than the metal for the stiffener disc 22, the spring segments 24 will expand more rapidly than the stiffener disc 22 under high operating temperatures.

Thus disclosed is a foil thrust bearing set having spring segments that are anchored to the stiffener disc. Anchoring instead of welding allows the spring segments to be made of dissimilar metals and composite materials that are compatible with the process fluid of the bearing set.

Anchoring instead of welding also allows the spring sectors to be fabricated far more easily than unitary spring clusters. This advantage is important at the present time, but it will become even more important in the future, as rotating machines using foil thrust bearing sets become larger.

Anchoring allows the spring segments to be secured to the stiffener disc far more easily than spot-welding. It also allows damaged spring segments to be removed from the stiffener disc, without having to replace the entire spring assembly.

Figure 5:
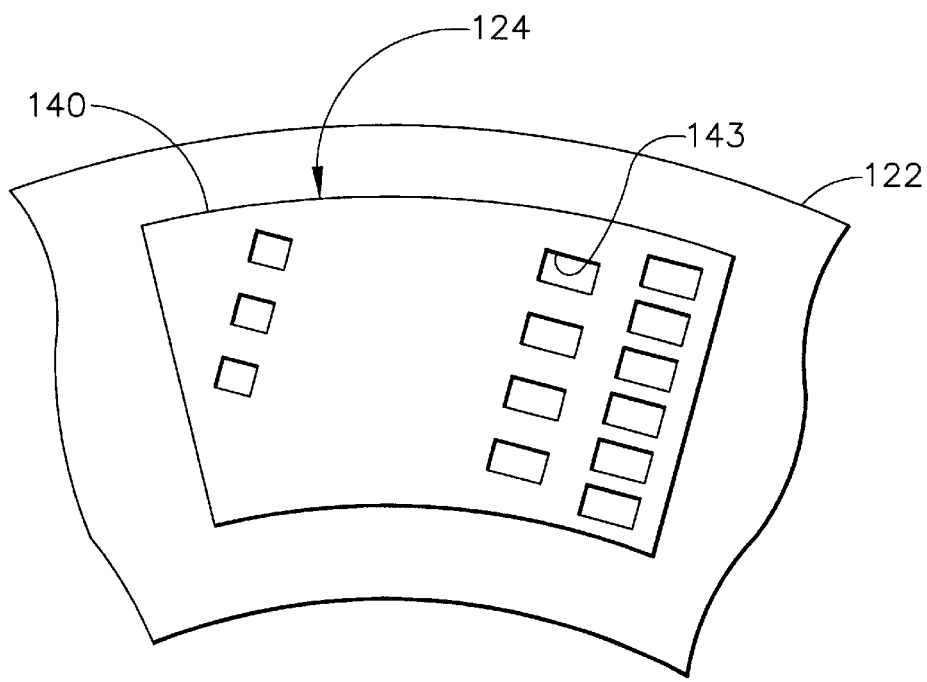
FIG. 5 is a fragmentary top plan view of another embodiment of the spring segment.

It is understood that additional changes and modifications could be made without departing from the spirit and scope of the invention. For example, FIG. 5 shows a spring segment 124 including a spring portion 140 having a single integral spring sector anchored to a stiffener disc 122. The spring portion 140 includes windows 143 that are sized and located to vary sector stiffness in the radial and circumferential directions. Such a spring portion 140 is described in U.S. Pat. No. 5,248,205, which is assigned to the assignee of the present invention.

Figure 6:
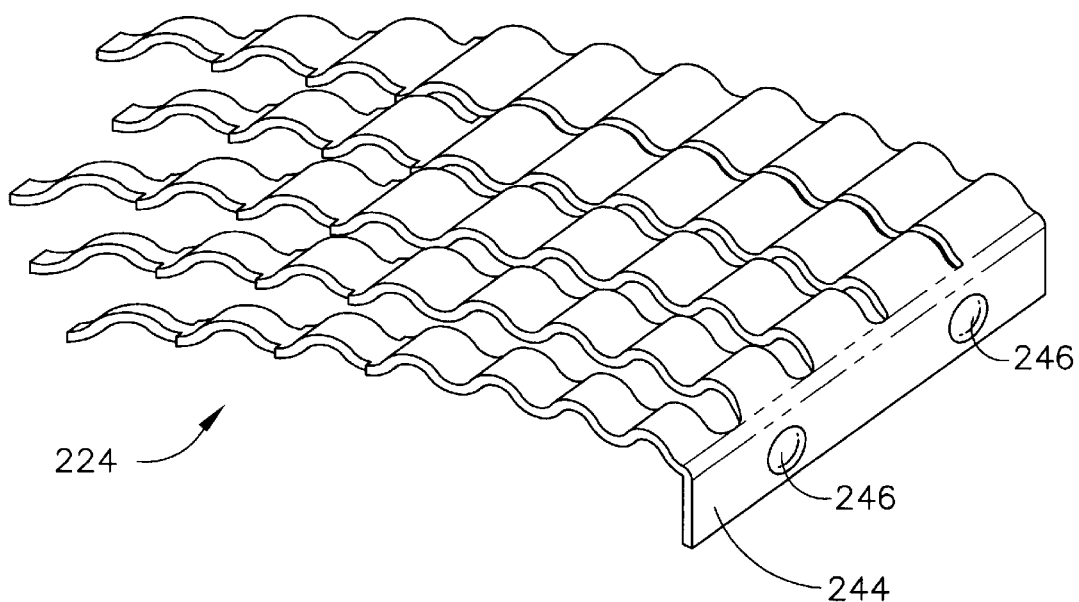
FIG. 6 is a perspective view of yet another embodiment of the spring segment.

FIG. 6 shows a spring segment 224 having indentations 246 instead of the outwardly bent anchoring tabs. The indentations 246 cause the anchoring portion 244 to be wedged within a slot of the stiffener disc, thereby causing the spring segment 224 to be anchored to the stiffener disc. The indentations 246 can be stamped into the anchoring portion 244 during fabrication of the spring segment 224.

Figure 7:
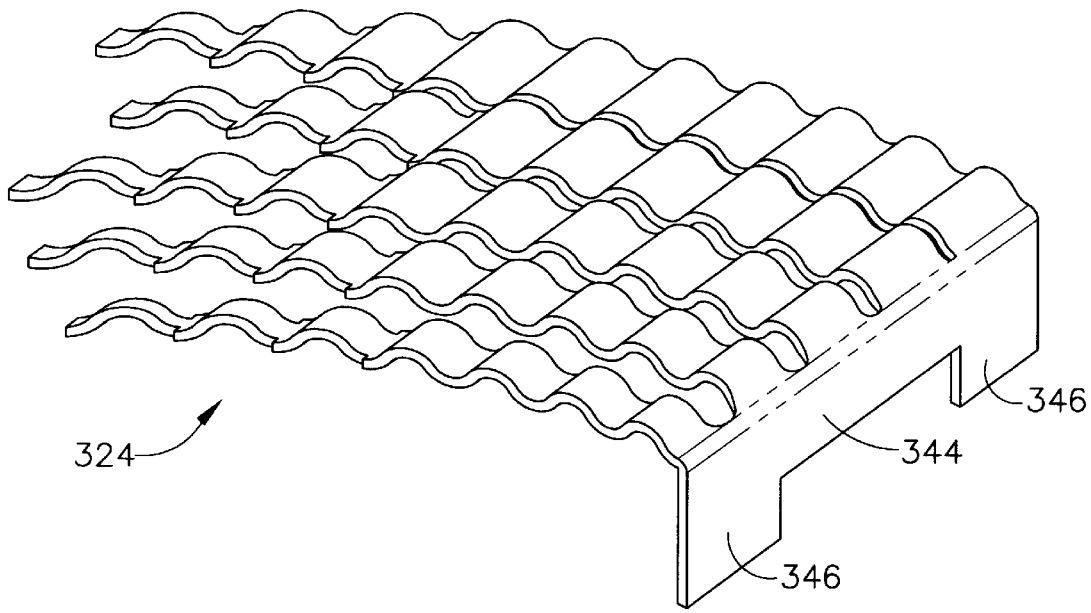
FIG. 7 is a perspective view of still another embodiment of the spring segment.
Figure 8:
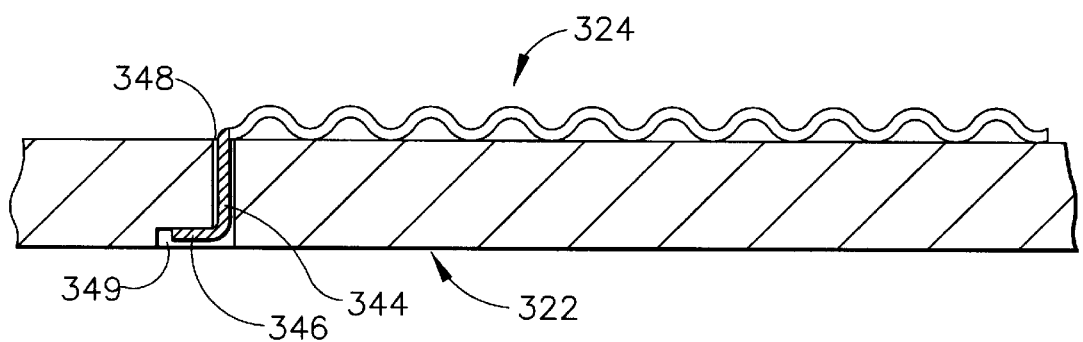
FIG. 8 is a cross-sectional view of a stiffener disc and the spring segment of FIG. 7.

FIGS. 7 and 8 show a spring segment 324 having straight anchoring tabs 346 instead of the outwardly bent anchoring tabs. The anchoring portion 344 is inserted into a slot 348 of the stiffener disc 322, and the tabs 346 are bent at a substantially right angle. The tabs 346 can be bent to produce the backwards Z-shape shown in FIG. 8, or they can be bent in an opposite direction to produce a C-shape. Space for the anchoring tabs 346 is provided by a wider slot 349 that is machined or chemically etched into the underside of the stiffener disc 322. Although the spring segment 324 of FIG. 7 has two straight tabs 346, such a spring segment 324 can have more or less than two straight tabs 346. In fact, such a spring segment 324 can have a single straight tab spanning the width of the anchoring portion 344.

Other changes and modifications could be made without departing from the spirit and scope of the invention. The number of anchoring tabs or indentations on a spring segment, their geometry and their orientation could be varied. The number of spring segments and slots in the stiffener disc could also be varied. These design considerations will all be driven by the requirements of the machine for which the bearing set is designed. The actual dimensions of the stiffener disc, the spring segments, the metal foils and the other components of the foil thrust bearing set, as well as the selection of a process fluid, will also be driven by the requirements of the machine for which the bearing set is designed.

We claim:

1. A foil bearing set comprising:

a foil bearing assembly including a plurality of compliant foils; and a spring assembly including a stiffener disc, and at least one spring segment underlying the plurality of compliant foils, each spring segment including a spring portion and anchoring means for anchoring the spring portion to the stiffener disc, the anchoring means being integral with the spring portion.

2. The foil bearing set of claim 1, wherein a plurality of spring segments are anchored to the stiffener plate, the plurality of spring segments underlying the plurality of foils.

3. The foil bearing set of claim 1, wherein the spring portion of at least one spring segment includes a plurality of spring sectors.

4. The foil bearing set of claim 1, wherein the spring portion of at least one spring segment includes a single spring sector.

5. The foil bearing set of claim 1, wherein the stiffener disc includes a plurality of slots, and wherein the anchoring means of at least one spring segment is anchored within a corresponding slot.

6. The foil bearing set of claim 5, wherein the anchoring means of at least one spring segment includes at least one anchoring tab, and wherein said spring segment is anchored to the stiffener disc when the anchoring means of said spring segment is inserted into the corresponding slot of the stiffener disc.

7. The foil bearing set of claim 6, wherein each anchoring tab is collapsible.

8. The foil bearing set of claim 1, wherein the stiffener disc is made of a first metal, and wherein at least one spring segment is made of a metal that is dissimilar to the first metal.

9. The foil bearing set of claim 1, wherein at least one spring segment is made of a composite material.

10. The foil bearing set of claim 1, wherein the stiffener disc is made of a first material, and at least one spring segment is made of a second material, the first material having a coefficient of thermal expansion different than that of the second material.

11. The foil bearing set of claim 1, further comprising a follower spring for preloading the spring assembly and the foil bearing assembly against a runner.

12. A spring assembly of a foil thrust bearing, comprising:

a spring stiffener disc having a plurality of slots; and a plurality of spring segments, each spring segment including a spring portion and anchoring means, each spring segment being anchored to the stiffener disc when its anchoring means is inserted into a corresponding slot in the stiffener disc.

13. The spring assembly of claim 12, wherein the spring portion of each spring segment includes a plurality of spring sectors.

14. The spring assembly of claim 12, wherein the spring portion of each spring segment includes a single spring sector.

15. The spring assembly of claim 12, wherein each anchoring means includes at least two anchoring tabs, whereby a spring segment is anchored to the stiffener disc when the anchoring tabs of the spring segment are inserted in corresponding slots of the stiffener disc.

16. The spring assembly of claim 15, wherein the anchoring tabs are collapsible.

17. The spring assembly of claim 12, wherein the stiffener disc is made of a first metal, and wherein the spring segments are made of a metal that is dissimilar to the first metal.

18. The spring assembly of claim 12, wherein the spring segments are made of a composite material.

19. The spring assembly of claim 12, wherein the stiffener disc is made of a first material, and the spring segments are made of a second material, the first material having a coefficient of thermal expansion different than that of the second material.

20. A spring segment for a spring assembly of a foil thrust bearing, the spring segment comprising:

a spring portion including a plurality of spring sectors; and an anchoring portion formed integrally with the spring portion; and at least two anchoring tabs formed integrally with the anchoring portion.

* * * * *